TYPEWRITER MARGIN CONTROL DEVICE HAVING MEANS TO POSITION CARRIAGE RETURN CODES

Filed Feb. 18, 1966

INVENTORS
P. R. ADAMS · J. W. WHITESEL
BY
[signature]
ATTORNEY

Sept. 12, 1967 P. R. ADAMS ETAL 3,340,986

TYPEWRITER MARGIN CONTROL DEVICE HAVING MEANS TO POSITION CARRIAGE RETURN CODES

Filed Feb. 18, 1966 2 Sheets-Sheet 2

United States Patent Office 3,340,986
Patented Sept. 12, 1967

3,340,986

TYPEWRITER MARGIN CONTROL DEVICE HAVING MEANS TO POSITION CARRIAGE RETURN CODES

Paul R. Adams, Upper Montclair, N.J., and James W. Whitesel, Western Springs, Ill., assignors to International Telephone and Telegraph Corporation, New York, N.Y., a corporation of Maryland Filed Feb. 18, 1966, Ser. No. 528,904
22 Claims. (Cl. 197—20)

ABSTRACT OF THE DISCLOSURE

A perforated tape for driving an automatic typewriter is marked by the typist to adjust the line length. The mechanical aids which facilitate a selection of the places for so marking the tape include a transparent tape guide for measuring the tape and a mechanical memory for moving the tape relative to the guide by an amount equivalent to the correction.

This invention relates to margin control devices and more particularly to devices for use with automatically operated typewriters.

As used herein, the term "automatically operated typewriter" implies a device which is controlled by pre-stored information data. For example, the data may be stored on perforated tape. When the tape is fed through the typewriter, it makes a clean copy of the text material stored on the tape. It is not necessary for a human typist to do anything more than place the tape in the typewriter and set a read out system into operation unless the command signals stored on the tape stops the typewriter and requires human assistance.

Sometimes, it is desirable to be able to make line length corrections on the tape so that the right-hand margin is adjusted to have a generally neat appearance when the clean copy is typed. Those skilled in the art will readily perceive many reasons why such line length corrections may be required. However, it may be helpful to here list a few such reasons so that the invention may be better understood. One reason is to justify the natural jaggedness of the right-hand margin so that it becomes a straight line. This tends to remove the typewritten appearance and give a printed appearance to the final copy. Another reason is to allow the typist to quickly and easily make editorial corrections in a previously typed copy. For example, recent developments in automatic typewriters allow editorial changes to be made in an original copy by collating an original tape and an editorial correction tape. If the collation amounts to insertions or deletions of relatively long passages, the printed line lengths stored on the collated tape may extend over random distances equal to several normal line lengths on a sheet of typing paper; or they may extend over fractional parts of normal line lengths.

In any event, the present invention starts with an assumption that a clean copy text of a typewritten message is stored on an information medium, such as a perforated tape. The stored data includes both a clear copy of the printed text material and typewriter command signals in the form of perforations, magnetic recordings, or the like. A familiar form of one such tape is called a "chadless tape" and is commonly used with teleprinters.

The invention is not immediately and directly concerned with either the specific source of the tape or the exact nature of the ultimate use of the tape. However, to illustrate a possible source and use, we refer to our co-pending application entitled, "One-Two Dimension Converter Control Circuit," Ser. No. 532,020, filed Jan. 7, 1966, and assigned to the assignee of this invention.

An object of the invention is to provide new and improved means for controlling the right-hand margin on a typewritten sheet of paper. More particularly, an object is to provide a simplified low cost right-hand margin control. Yet another object is to provide an easily used right-hand margin control which may be utilized without requiring computations, memory, or retyping. In this connection, an object is to reduce the human error factor.

In keeping with one aspect of the invention, these and other objects are accomplished by means of a tape transport mechanism having a measured length thereon. This length corresponds to the distance along a data storage tape that is required to store the command signals which will cause an automatic typewriter to print out a single line of a desired length on a sheet of typing paper. The tape is placed on the transport mechanism in a position where the start of the printed line is at the start of the measured length. Then, a symbol marking the end of the line stored on the tape is compared with the end of the measured length on the tape transport mechanism. If the line end symbol is not correct with respect to the measured length, the tape is suitably marked to command the typewriter to make adjustments during print out. For example, the markings may add or subtract spaces or they may command carriage return with or without hyphens. These markings may be made to adjust line length either within allowable margin settings or to justify the margin to a fixed point at the end of the line.

The above mentioned and other features of this invention and the manner of obtaining them will become more apparent, and the invention itself will be best understood by reference to the following description of an embodiment of the invention taken in conjunction with the accompanying drawings, in which:

FIG. 1 symbolically shows a sheet of typing paper which illustrates why and how right-hand margin corrections are required;

Our above identified co-pending application shows a typewriter 8 (FIG. 8) having two perforating machines 9 for making a first tape corresponding to an original copy and a second tape corresponding to editorial corrections in the text material stored on the first tape. These two tapes are then collated to produce a new tape which stores a text that is the same as the original text stored on the first tape as amended by the editorial corrections stored on the second tape. The new tape is preferably a conventional chadless tape which carries both a printed record and a perforated record prepared in a well known manner. This is the tape seen in the other figures.

Figure 1:
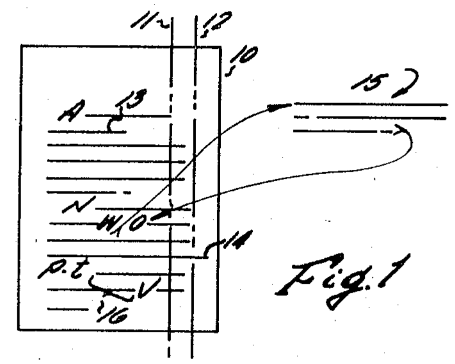

FIG. 1 illustrates the problems which may occur in the right-hand margins of a letter which is automatically typed from the new tape. The sheet of paper 10 has copy typed thereon which resulted from an automatic print out commanded by the information data stored on the new collated tape. It is assumed that the typist has decided that any line is within acceptable right-hand margin tolerance limits if it ends between the dot-dashed lines 11 or 12. Thus, the typed line 13 is too short because it fails to reach the margin limit 11, and the typed line 14 is too long because it exceeds the acceptable margin limit 12. Perhaps this was a result of an original typist error. Or, perhaps a word or two were deleted from line 13 and a word or two were added to line 14. If the decision is to justify the margin, every printed line will end on the same vertical margin limit 11 or 12.

The reference numeral 15 indicates a relatively long editorial correction insertion which could have been made between the letters "w" and "o" on the sheet 10. The reference numeral 16 indicates a relatively long editorial correction deletion which could have been made between the letters "t" and "v." If either of these editorial corrections had been made, a number of the line endings would have been distributed over the paper almost at random. However, it is obvious that no line ending will be off by more than half of an acceptable typed line length. Either it is shorter or it is longer than one-half the acceptable line length. Thus, as soon as a few lines have been stretched to make up or shrunk to lose this not over half a typed line length, the original carriage return symbols will again be correctly located.

In the FIG. 1 example, the problems are, therefore, to lengthen line 13, shorten line 14, fit the editorial insert 15 into the page between letters "w" and "o," and remove the deletion 16 while fitting the passage "t" and "v" together.

The tape is marked with problem-solving command signals required to accomplish these—and any other—line length corrections.

Figure 8:
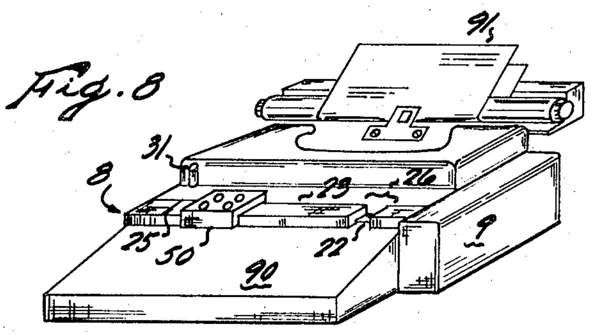
FIG. 8 is a perspective view showing how the invention may be integrated with a typewriter for use while the sheet of paper that is being corrected is still in the typewriter.

To do this, the collated tape reel 20 is put on a transport mechanism 21. The tape 22 is then pulled from reel 20, under a plate 23, and wound onto a take-up reel 24. The location of the tape transport mechanism 21 is not important. It could be part of the typewriter as shown in FIG. 8; or, it could be part of a separate jig. For the purposes of this description, the assumption is that it is a separate jig.

When tape 22 crosses the transport mechanism 21, it is covered by the plate 23 which is either transparent or has a window so that the printing on the tape 22 can be ready by a person looking down on the tape. A cross hairline 25 is located on the plate 23 adjacent the one end thereof. A window 26 is adjacent other end of the plate 23. The distance betweeen hairline 25 and window 26 is a measured length which corresponds to the acceptable length of a line on a sheet of typing paper. If the tape is positioned so that the start of a printed line is under the hairline 25, that printed line may end at any location which appears in the window 26 and still be within the tolerance (lines 11, 12, FIG. 1) which presents a reasonably neat right-hand margin. A hairline 29 may be located in window 26 to provide a right-hand margin to which the line end may be justified, if desired. Either or both the cross hair 25 or the window 26 (or hairline 29) may be moved left or right to correspond to the margin setting adjustments which the typist has made on the typewriter. The drawing shows knobs 27, 28 for adjusting the position of hairline 25 and window 26, respectively.

Figure 2:
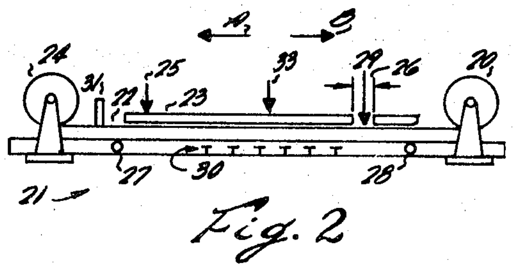
FIG. 2 is a side elevation view of a mechanism for supporting and transporting a data storage tape.

FIG. 2 also shows a row of keys 30 which may print different symbols on the tape 22. A plurality of different symbols are provided by these keys so that there will be a separate symbol for every correction that may be reasonably expected to be made. These symbols could be binary coded digits printed on the tape; or, they could have unique ultra-violet, magnetic, colored ink, or other characteristics. Preferably, these symbols are printed on the tape in a manner which avoids confusion with the message already printed on the tape. In the case of non-magnetic symbols, they are located on the tape to be read optically; the optical reader is symbolically shown at 31. The exact nature of the symbol is unimportant as long as it can be read with the proper output response.

The operation here is that the tape is moved either left or right in the direction of the arrows A or B to bring the point of correction under a hairline 33. Or, alternatively, the hairline 33 is moved left or right to bring it over the point of correction on the tape 22. Then one of the keys 30 is struck, and a symbol is printed on the tape at the selected point. The symbol could indicate an addition of a space or a half-space, a subtraction of a space or a half-space, or a carriage return, either with or without a hyphen. In this manner, the line of print may be made longer or shorter.

The nature of the equipment for accomplishing these ends may become more apparent from a study of three exemplary embodiments of the invention shown in FIG. 3–7.

Figure 3:
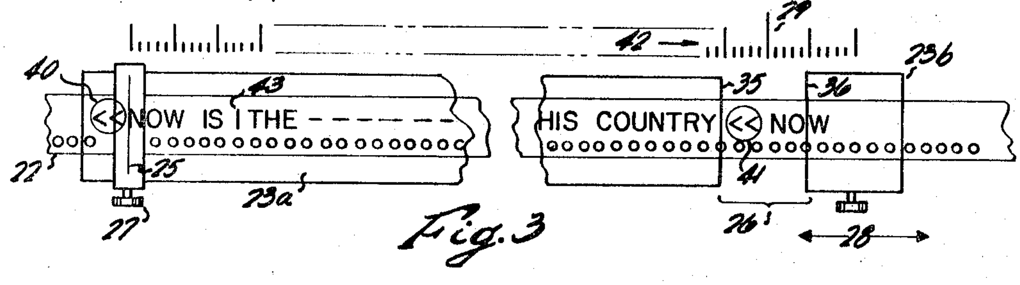
FIG. 3 is a top plan view looking down on the mechanism of FIG. 2 which illustrates a first embodiment of the invention for making the right-hand margin corrections within pre-determined tolerances.

In the embodiment of FIG. 3, the plate 23 includes two pieces of a transparent material. The plate 23*a* covers a measured distance along tape 22 required to store typewriter command signals which correspond to the short tolerance length of a typed line of print on the typewritten sheet of paper 10. The plate 23*b* covers the tape 22 after the measured distance has exceeded the long tolerance extreme or forbidden zone of the right-hand margin. Thus, edge 35 of plate 23*a* represents the shortest allowable line of print and corresponds to the short margin tolerance line 11 of FIG. 1. The edge 36 of plate 23*b* represents the longest allowable line and corresponds to the long margin tolerance line 12.

The knob 27 adjusts the position of hairline 25 to set the left-hand margin relative to the short tolerance line 11 of the right-hand margin. The knob 28 adjusts the position of edge 36 relative to the long tolerance line 12 of the right-hand margin.

To use this FIG. 3 device, a typist observes a margin control command signal (which may be a carriage return symbol 40) printed on the tape 22. Then, she sets this carriage return symbol under the hairline 25.

The typist observes the tape in the window 26. If she sees another carriage return symbol 41 in the window 26, there is no right-hand marginal problem. Thus, FIG. 3 has been drawn to show that a typed line of print has an acceptable length, and ends at the short tolerance limit 11. If carriage return symbol 41 appears where the letter "o" appears in the word "now," this line of print would end at the long tolerance line 12 of FIG. 1. If she does not see a carriage return symbol in window 26, she observes whether the closest symbol is on the left or right of the window. Depending upon how close the closest return symbol is, she may decide to lengthen or shorten the line under plate 23*a*; or, she may decide to break-off the line of print at some place which appears in the window 26. She does this by marking a command signal on the tape 22. A scale 42 helps her decide by telling her how many spaces must be added or subtracted to reach the tolerance limits.

Arbitrarily, we might assume that she marks the tape with one of several colored pencils or felt marking pens.

The colors she uses are assumed to have the following meaning:

Blue=carriage return, no hyphen
Red=carriage return after insertion of a hyphen
Black=carriage return (or other command signal) override
Green=space added (or subtracted)—more colors could be used to mean add (or subtract) a fraction of a space During read out, when the tape 22 is used to drive a typewriter to type a clean copy, the optical reader 31 detects the marks, according to color, in a well known manner. For example, photocells could be used behind colored filters. If she decides to add (or subtract) a few spaces, she merely turns the take-up reel 24 and places a green line on the tape 22 as it passes out from under the plate 23*a*. By way of example, the line 43 could be a green mark placed on tape 22. During print out, this mark 43 will cause the automatic typewriter to add a space between "is" and "the." In like manner, other colors could be used to add or subtract whole, half, or other fractional spaces at any point along the tape. The typist merely reads scale 42 and puts the indicated number of marks of the correct color at the spots on the tape 22 where she decides to make a change.

The typist might also decide that she wants the carriage to return and mark a spot on the tape in the window 26. A blue pencil is used if carriage return is between words and no hyphen is required. A red pencil is used if carriage return is between syllables and a hyphen is required. For example, if the carriage return symbol 41 did not appear in the window 26, she would put a blue pencil mark between "country" and "now." Then she watches the tape while she turns the reel 24 and pulls it from under the plate 23*a*. When an out of place carriage return symbol appears, she marks over it with a black pencil. Then, during read out, the typewriter will detect the black mark and the carriage will not return despite the original carriage return symbol appearing on the tape. Instead, the carriage will return when the blue or red pencil mark is read.

Next, she places the new carriage return mark (either a red or blue pencil mark) under the hairline 25 and looks to see if a carriage return symbol appears in window 26. If so, there are no further margin correction problems. If a carriage return symbol does appear in window 26, the carriage return symbols originally typed on the tape 22 will make a proper right-hand margin. If not, she repeats the process until one does so appear. Never will she have to make more than a half-line correction; thus, she should be able to stretch or shrink the lines to squeeze in a piece of typing.

To stretch the lines, she will add spaces and/or put the red or blue pencil marks as close as possible to the edge 36 of the window 26. To shorten the lines, she will subtract spaces or put the red or blue mark as near as possible to the left-hand edge 35 of the window 26. Normally, it will not be necessary to adjust the length of any more than four or five lines before she observes a carriage return symbol in the window 26. Thereafter, the right-hand margin is obtained automatically as a result of the original typing.

There are no problems resulting from the change in the number of lines on a page. During print out, the typewriter will type until it has placed the required number of lines on a page, and then it will stop. The typist or a machine feeds a new sheet of paper into the typewriter and typing continues. Thus, an amendment which adds a number of lines may result in the typing of additional sheets of paper. Conversely, a deletion of lines may result in fewer sheets of paper.

Figure 4:
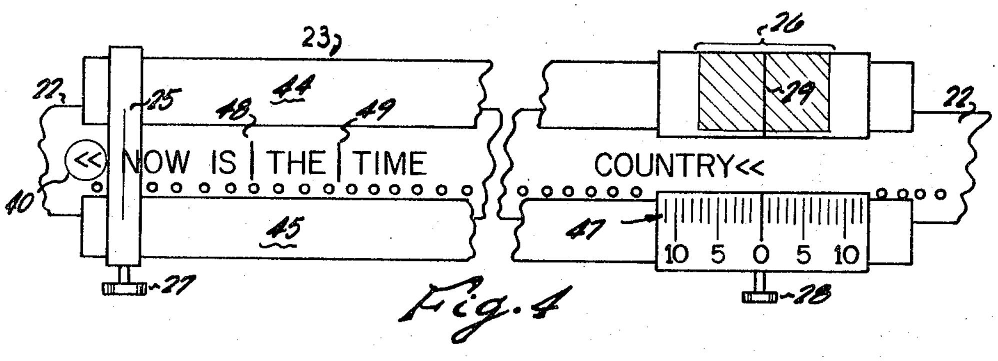
FIG. 4 is a similar top plan view which illustrates a second embodiment of the invention for either justifying the margin or making tolerance corrections.

To justify the right-hand margin, the plate 23 may be constructed as shown in FIG. 4. The tape 22 runs under two preferably transparent edge guides 44, 45 so that the tape 22 may be marked while it is under plate 23. The hairlines 25 and 29 appear on a guide near the printing on the tape. Again, the typist moves the tape 22 to put a carriage return symbol 40 under the hairline 25. She looks in the window 26 and observes where the next carriage return symbol is located relative to the desired right-hand margin hairline 29. In the illustration of FIG. 4, she sees that the last letter to be printed on the line is the letter "y." Then she observes a scale 47 and notes that the line of print ends four steps short of the hairline 29. So, she adds four steps by placing green pencil marks on the tape, as shown at 48, 49, and elsewhere. During print out, the tape drives the automatic typewriter to insert an extra space step at each of these two points 48, 49 and wherever else a green mark appears. This will bring the letter "y" flush with the right-hand margin identified by hairline 29.

If the typist reads scale 47 as a requiring a carriage return, she uses a red or blue pencil carriage return mark (depending on whether a hyphen is or is not required).

Figure 5:
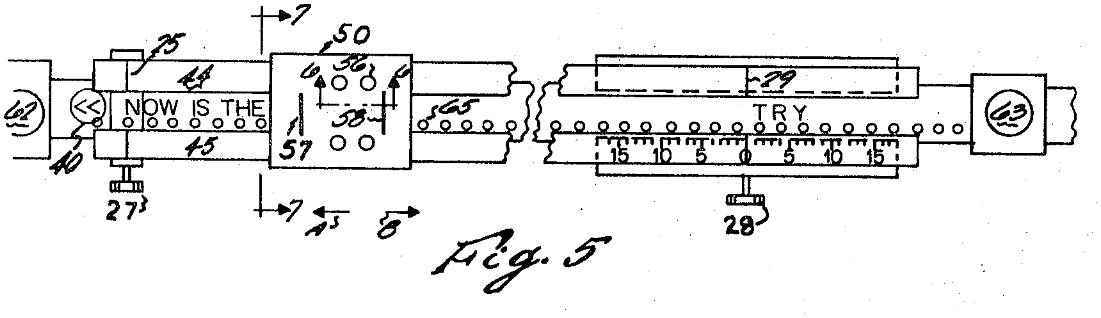
FIG. 5 is yet another top plan view which illustrates a third embodiment of the invention for either justifying the margin or making tolerance corrections.
Figure 6:
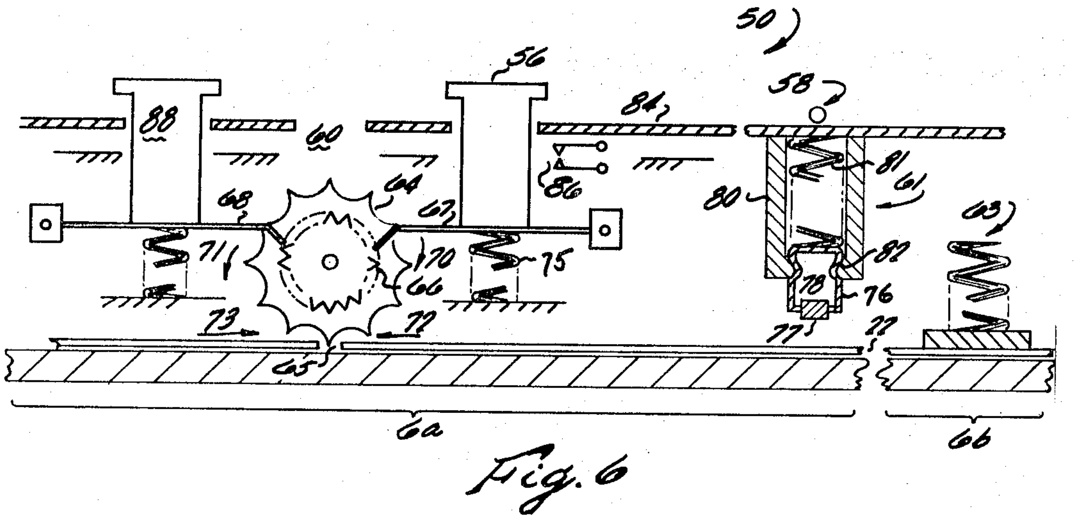
FIG. 6 is a cross sectional view of a fragment of FIG. 5, taken along line 6—6, to illustrate how the operation of a line correction means may be made to store a memory of each correction as it is made.
Figure 7:
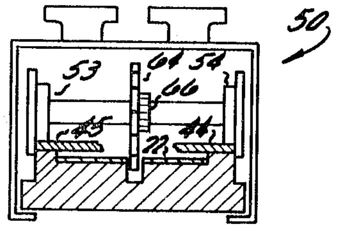
FIG. 7 is an end view of a fragment of FIG. 5, taken along line 7—7.

The embodiment of FIGS. 5–7 provides for a more sophisticated and automatic justification of the right-hand margin. This embodiment tends to eliminate human errors. For present purposes, those portions of FIG. 5 which also appear in FIG. 4 may be considered as identical therewith.

In addition, FIG. 5 shows a sliding or rolling assembly 50 which moves back and forth along the guideways 44, 45 in the directions of the arrows A, B. As shown by the end view (FIG. 7) a preferred embodiment of this assembly 50 is mounted on wheels 53, 54 to roll along the guideways 44, 45. The mechanism controlled by the knobs 27, 28 are arranged beneath the guideways 44, 45 so that the assembly 50 may sweep over the entire length of guideways 44, 45. Since this assembly is somewhat suggestive of a railroad hand-car, the device 50 is hereinafter called a "hand-car;" however, the name is not to be taken as, in any way, restrictive upon the nature of device 50.

The hand-car 50 includes a plurality of pushbuttons or keys (such as 56), a pair of hairlines 57, 58, a tape position control device 60, and marker means 61. In addition, the entire assembly includes a pair of tape motion restraining devices 62, 63 for applying a tension to the tape to prevent unwanted tape motion.

The key 56 (and other similar keys) control the marking of the tape. Under the foregoing assumptions, they may be color coded blue, red, black, and green to indicate the corresponding read out functions which they command. The hairlines 57, 58 identify the spot on the tape 22 where a color coded mark is printed when an associated key is pushed.

The tape position control device 60 includes a sprocket wheel 64 which runs in a row of sprocket holes 65 on the tape 22. Associated with the sprocket wheel 64 is means for imparting an incremental rotary motion, here shown as a gear 66 and pair of pawls 67, 68. If the pawl 67 is pushed down, the gear 66 and sprocket 64 rotate over an increment of distance in a clockwise direction 70. If the pawl 68 is pushed down, the rotation is in a counter-clockwise direction 71. When rotation is clockwise, the sprocket wheel pulls tape 22 an incremental distance in the direction 72. When rotation is counter-clockwise, sprocket 64 pulls tape 22 in the direction 73.

Spring 75 provides forces for restoring the pushbutton 56 to a normal position.

The assemblies 62, 63 apply a pre-determined pressure on tape 22 to maintain sufficient tension to prevent the tape 22 from taking a random lateral motion in either of the directions 72, 73. However, the pressure applied at 62, 63 is not sufficient to prevent the sprocket 64 from moving the tape. The reels 20, 24 may have a slight driving force applied at all times as through a slipping clutch or a spring-like drive belt to assist the sprocket 64 when it moves the tape 22.

The marker means 61 is here shown as including a barrel 76 having a felt tip 77 on one end, and an ink supply well 78 therein. The ink may also have the color of the above assumed coding—it could also be an ultra-violet ink. The barrel 76 is positioned inside a holder 80 and spring biased at 81 to insure an adequate marking pressure at the end of the felt tip 77. An indentation 82 restrains the barrel to keep it from falling out of the holder 80; however, the fit is loose enough to avoid interferring with the bias applied by the spring 81.

Any suitable mechanical linkage 84 connects the marking assembly 61 with the associated pushbutton 56. Here, the linkage is shown as a simple presser foot. However, the linkage is such that the tape is marked and the felt tip 77 snaps up out of engagement with the tape before the sprocket 64 can move the tape. Thus, whenever the key 56 is pushed, the tip 77 presses against the tape 22 at the spot indicated by hairline 58.

In operation, the pushbutton 56 is normally urged into an upper position by the bias of the spring 75. The typist moves the hand-car 50 so that the hairline 58 is over the spot on the tape where a spacing adjustment is to be made. Then the typist selects a pushbutton that is marked in the color and function required. For example, a blue button may be marked "CR" (carriage return without hyphen) and a red button may be marked "CR-" (carriage return with hyphen) under the above coding assumptions. Felt tip 77 will, therefore, print a carriage return symbol on tape 22 when these buttons are pushed. Thereafter, tip 77 snaps away and then the tape moves. If key 56 is a carriage return key, a set of contacts 86 may also be supplied to cause reel 24 to turn and advance the tape until the new carriage return symbol just printed by tip 77 on the tape comes to rest under the optical reader 31 and hairline 25. This is particularly useful when the mechanism is part of the typewriter, as shown in FIG. 8.

If the puushbutton 56 is a green button for adding a space, it could be marked "+1" or "+½" to indicate that it adds a full space or a half-space, respectively. Or it could be marked with some other fraction, as required.

After the typist selects a button, she pushes it down against the bias of the spring 75. The marker means 61 moves down and puts a spot of colored ink on the tape in the space under hairline 58. Pawl 67 moves down against gear 66, which rotates in direction 70. The sprocket wheel also rotates, and tape 22 is pulled in the direction of the arrow 72. The resulting tape motion is an amount corresponding to the added space correction which will be made by the automatic typewriter during a clean copy print out. Thus, it is seen that tape motion stores a memory of the effect of each correction as it is made.

The typist observes the printed under the right-hand margin hairline 29. If the tape has not been pulled far enough, she moves the hand-car 50, until hairline 58 is over another desired spot on the tape 22. Then another pushbutton is pushed. The tape 22 moves once more to store a memory of the effect of the space adjustment. Again, the typist looks under hairline 29 to see if the end of the line of print has been moved to the correct margin spot. The process is repeated until the line length is correct.

The pushbutton 88 may have some other code—it could be orange, for example. This key would perform a function similar to the green key except that it removes a space during print out and pushes the tape in the direction of the arrow 73, perhaps by an amount equal the space occupied by a third of a character. Thus, key 88 is pushed to shrink a line length when the hairline 57 is over a selected spot on tape 22 where space may be taken from the line. From this, it is seen that lines may be shortened as well as lengthened.

If the typist looks under the hairline 29 and sees that she has over-compensated, she can move the hand-car 50 over a previously marked spot and push the black button which causes the typewriter to ignore a command signal. This black mark will cover and cancel the previous marking.

The margin also may be justified while the original copy is still in the typewriter. This justification is done in any of the manners described above in connection with FIGS. 3–7. The tape 22 (FIG. 8) runs across the front of the typewriter above and slightly behind the keyboard 90, as shown in our co-pending application. This position facilitates an easy visual comparision between the original copy sheet of paper 91 in the typewriter and the information written on the tape.

When it crosses the keyboard 90, the tape 22 is covered by a plate 23 having the hairline 25 adjacent one end and window 26 adjacent the other end. Again, if the tape is positioned so that the left-hand margin start of a line is under the hairline 25, the printed line may end at any location which appears in the window 26 and still present a reasonably neat right-hand margin; or, it may end on hairline 29 to justify the margin. To facilitate this operation, an extra set of contacts are placed on the carriage return key. Every time that the carriage return key is struck, these contacts close a circuit to the tape drive. The tape is then driven automatically until the detector 31 associated with the hairline 25 provides an output symbol to stop the tape drive. The carriage return symbol is then located at a point which corresponds to the desired left-hand margin as shown in FIGS. 3–5. This way, the left-hand margin position of the tape is set automatically. The typist is only required to read the apparent right-hand margin and make the appropriate corrections with colored pencils or hand-car 50 in a manner which should be apparent from a study of the above description.

Figures 9, 10:
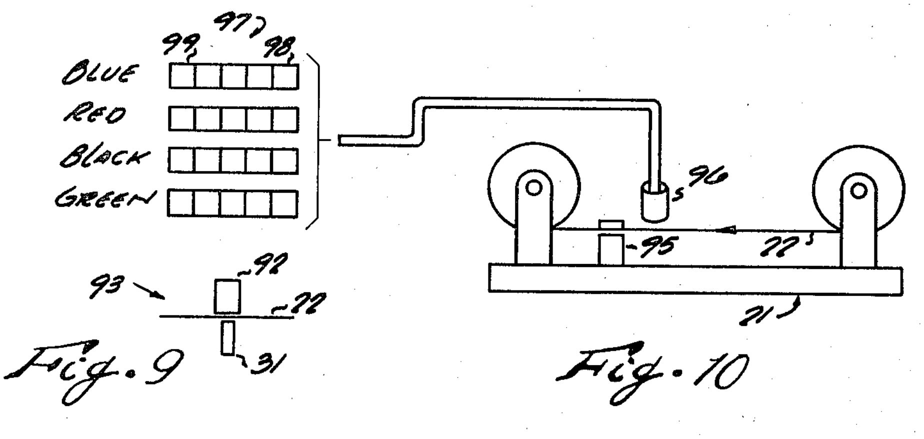
FIG. 9 shows a perforation reader and an optical reader for simultaneously reading the typewriter command signals and the manually inserted line length symbols.
FIG. 10 is a block diagram showing how the two readers may be displaced from each other with a buffer storage shift register for electrically coordinating the two readers.

As explained above, the detector 31 may be any device adapted to respond to the marks which are manually inserted on the tape. Of course, it is possible that a perforation reader 92 may be placed on one side of the tape and the manually inserted mark detector 31 may be placed on the other side of the tape, as shown at 93 (FIG. 9). The function of the reader 92 is to read the perforations (or equivalent symbols) on the tape 22 and then command the read out typewriter to type a corresponding character. The function of the reader 31 is to respond to the manually inserted marks by over riding or otherwise modifying the symbols read out at 92 and used to command the typewriter.

More than likely, however the perforation reader would interfere with a simultaneous reading of the manually inserted marks. Therefore, if the perforation reader is positioned as at 95. (FIG. 10), the manual mark reader 96 must be displaced so that the two do not read simultaneous commands. The reader at 96 must be at a location where it reads the manually inserted marks before the corresponding marks can be read by the perforation reader at 95. The exact distance between the two reader locations 95, 96 is not material. However, it is obvious that there will be some fixed number of steps between the two readers. For the remainder of this description, it is assumed that there are five such steps.

Means are provided for commanding the typewriter to take the action indicated by the marks when the corresponding mark is passing through the perforation reader. More specifically, since there are five steps between the two reader positions 95, 96 the read out device is provided with a number of five step shift registers 97, there being one such five step shift register for each of the four manually inserted colors assumed to be used here. If more colors are used, more shift registers are provided on a 1:1 ratio. Thus, for example, if a blue mark is detected by the reader at 96, a signal is entered into the start position of the shift register 97 at stage 98.

Shift registers—and other forms of counting circuits—of the described type are old and well known. For example, textbook disclosures of counting circuits are found in the book "Understanding Digital Computers" by Paul Siegel, John Wiley and Sons, Publisher (1961). Any of many U.S. patents can also be cited to show similar circuits, such as Patents 3,263,625 (FIG. 25), 3,177,291 (FIG. 4), 2,954,860, and 2,656,460.

Each time that the tape 22 takes a step, the signal in the shift register advances a step. When the signal stored in the shift register reaches the stage 99, the typewriter takes the manually commanded action indicated by a blue mark. Likewise, red, black, green, or any other colored marks, would be entered in a shift register assigned to the respective color. Then, after the tape takes five steps, the typewriter performs the function commended by that manually colored mark.

The invention has been described in a manner which will facilitate an understanding of the principles. However, it should be understood that these principles have many applications other than those specifically described herein. For example, the "green" key could be a family of keys for adding any desired number of different incremental line length corrections. The tape may be held in an immobile position and the hairline 29 and scale 47 may move to store the memory of corrections as they are made. The colored ink spots may be any convenient coding. For example, they could be the banker's symbols commonly used on checks. Still other modifications will readily occur to those skilled in the art.

While the principles of the invention have been described above in connection with specific apparatus and applications, it is to be understood that this description is made only by way of example and not as a limitation on the scope of the invention.

We claim:

1. A device for controlling the right-hand margin on a print out copy of a typewritten sheet of paper comprising a prestored data information medium having thereon both clear copy of the typewritten text material and typewriter command signals for causing said print out copy to be made, at least one of said signals being a right-hand margin control command signal which appears at the end of each line of typing, tape transport means having a measured length thereon effectively equivalent to the distance along said medium which is required to store the command signals which will cause said typewriter to type a line having a desired length on said sheet of paper, means for comparing the measured length with the distance between the margin control command signals appearing on said medium, and means for adjusting the spacing commanded during print out to bring said margin control signals to desired locations on said sheet of paper, thereby adjusting the lines of said print out copy to have said desired length.

2. The device of claim 1 and means for causing said adjusting means to bring said margin control signals within long and short line tolerances.

3. The device of claim 1 and means for causing said adjusting means to bring said margin control signals to fixed locations on justifying the typewritten copy made during said print out.

4. The device of claim 1 and means for automatically giving a read out of the effect of said adjusting command for reducing human errors in the location of said margin control signals.

5. The device of claim 1 and means for making said spacing command adjusting signals while said medium is originally being prepared.

6. The device of claim 1 wherein said transport means comprises means for pulling said medium from a storage reel, adjacent a plate, and wound onto a tape-up reel, said plate having said measured length indicated thereon whereby the distance between any two successive ones of said margin control command signals may be compared with said measured length indications while said tape is being pulled adjacent said plate to determine whether the line length in said print out will meet predetermined margin requirements.

7. The device of claim 6 and means for manually marking said medium to adjust the length of a typed line to correspond with said measured length indications, whereby each typed line corresponds to desired marging settings for said print out.

8. The device of claim 6 wherein the left-hand margin indication is a hairline on said plate and the right-hand margin indication is a window having a length which corresponds to the short and long line tolerance settings of said print out copy.

9. The device of claim 6 wherein both the left and right-hand margin indications are hairlines for justifying the line length of said print out copy.

10. The device of claim 6 and means adjacent said length indication for indicating the number and kind of said space adjusting command signals which are required during print out.

11. The device of claim 6 and means for manually putting said space adjusting command signals on said medium at points where said space adjustment will be made during said print out, and means operative substantially simultaneous with said manual putting of said signal on said medium for adjusting the position of said tape relative to said length indications to store a memory of the affect of said manual adjustment signal as it is made, said tape position adjustment being a length adjustment of the position of said tape relative to said measured length indications which corresponds to the amount of the adjustment which will be made during said print out responsive to the manual command signal.

12. The device of claim 1 wherein said space adjusting command signals comprises means for selectively commanding carriage return with and without hyphens.

13. The device of claim 1 wherein said space adjustment command signals comprises means for selectively adding or subtracting spaces and fractional spaces.

14. The device of claim 1 wherein said adjusting command signals are marks which are manually inserted on said information medium, first means for reading said right-hand margin control command signals from said medium as it advances in a given direction, means responsive to said last named means for commanding said typewriter to return its carriage whenever said margin control command signal appears, auxiliary reading means positioned relative to said given direction of advancing for reading said marks before said first means reads said right-hand margin control signals, said medium advancing a predetermined number of steps between the positions of said two readers, means responsive to the detection of a manually inserted mark for storing a memory of the function commanded by said mark, and means responsive to said medium advancing said predetermined number of steps for causing said typewriter to perform said commanded function when said medium is in a position where said detected mark could be read by said first reader.

15. The device of claim 1 wherein said medium is perforated tape, said signals are stored as perforations in said tape and said space adjusting signals are marks manually inserted on said tape, a first reader for reading said perforations, a second reader for reading said marks before the marked part of said tape passes through said first reader, and means responsive to said second reader for commanding said typewriter to take the action commanded by said marks when the corresponding mark is passing through said first reader.

16. A margin control device comprising means storing command signals and clear copy type represented by said command signals on a reel of tape, certain of said command signals being margin control signals, means selectively mounted on or off a typewriter for correcting the position of carriage return symbols appearing on said tape, said last named means comprising scale means for measuring a length of said tape itself, said scale corresponding to the desired length of tape between adjacent ones of said margin control signals, and means for marking said tape itself at point selected relative to said clear copy to alter said command signals for selectively stretching or shrinking a line length.

17. The device of claim 16 and means for optically reading said marking, and means responsive to said reading for giving output signals which cause said stretching or shrinking of said lines.

18. The device of claim 16 and manually controlled key operated means for applying said markings.

19. The device of claim 16 and manual means for applying said markings.

20. The device of claim 16 and means for automatically keeping track of the effects of said altered command signals as they are made.

21. The device of claim 16 wherein said command signals are perforations on said tape and said markings are manually inserted on said tape, means responsive to a reading out of perforations representing said margin control signals to command a margin control function, and means responsive to a reading out of said marks for causing another margin control function when the marked part of said tape is in a position such that the corresponding perforations are being read out.

22. The device of claim 21 wherein two readers are provided for reading said perforations and marks respectively, said readers being displaced from each other by a predetermined amount of tape travel, means responsive to read out by one of said readers for storing record of a command as it is read out, and means responsive to an advancement of said tape by said predetermined amount of travel for causing the response indicated by a stored one of said commands, whereby both of said readers effectively read said tape simultaneously.

References Cited

UNITED STATES PATENTS

| | | | |
|---|---|---|---|
| Re. 25,354 | 3/1963 | Rossetto et al. | 197—19 X |
| 2,788,886 | 4/1957 | Paulding et al. | 197—20 X |
| 2,838,114 | 6/1958 | Goetz et al. | 197—20 X |
| 2,968,383 | 1/1961 | Higonnet et al. | 197—20 |
| 3,063,536 | 11/1962 | Dirks | 197—19 |
| 3,260,340 | 7/1966 | Locklar et al. | 197—20 X |

ROBERT E. PULFREY, *Primary Examiner.*

E. S. BURR, *Assistant Examiner.*